US012700184B2

(12) United States Patent
Zou et al.

(10) Patent No.: US 12,700,184 B2
(45) Date of Patent: Aug. 4, 2026

(54) SYSTEM AND METHODS FOR REFINING ROOM SEGMENTS TO IMPROVE AESTHETIC QUALITY FOR END-USER APPLICATIONS

(71) Applicant: Robert Bosch GmbH, Stuttgart (DE)

(72) Inventors: Lincan Zou, San Jose, CA (US); Christian Juette, Redwood City, CA (US); Liu Ren, Saratoga, CA (US)

(73) Assignee: Robert Bosch GmbH, Stuttgart (DE)

( * ) Notice: Subject to any disclaimer, the term of this patent is extended or adjusted under 35 U.S.C. 154(b) by 162 days.

(21) Appl. No.: 18/663,160

(22) Filed: May 14, 2024

(65) Prior Publication Data

US 2025/0356589 A1 Nov. 20, 2025

(51) Int. Cl.
*G06T 17/20* (2006.01)
*G06T 5/50* (2006.01)
*G06T 5/73* (2024.01)

(52) U.S. Cl.
CPC .............. *G06T 17/205* (2013.01); *G06T 5/50* (2013.01); *G06T 5/73* (2024.01); *G06T 2200/24* (2013.01); *G06T 2210/12* (2013.01)

(58) Field of Classification Search
CPC ........... G06T 17/205; G06T 5/50; G06T 5/73; G06T 2200/24; G06T 2210/12; G06T 17/20; G06T 2210/04
See application file for complete search history.

(56) References Cited

U.S. PATENT DOCUMENTS

| | | | | |
|---|---|---|---|---|
| 8,884,955 B1 * | 11/2014 | Hsu | | G06T 17/205 |
| | | | | 345/419 |
| 10,026,218 B1 * | 7/2018 | Mertens | | H04N 13/332 |
| 12,106,437 B1 * | 10/2024 | Elahie | | G06T 17/205 |
| 2004/0201584 A1 * | 10/2004 | Lee | | G06T 19/00 |
| | | | | 345/420 |

(Continued)

OTHER PUBLICATIONS

S. . T. Wu and M. R. G. Marquez, "A non-self-intersection Douglas-Peucker algorithm," 16th Brazilian Symposium on Computer Graphics and Image Processing (SIBGRAPI 2003), Sao Carlos, Brazil, 2003, pp. 60-66, (Year: 2003).*

(Continued)

*Primary Examiner* — Kee M Tung
*Assistant Examiner* — Nauman U Ahmad
(74) *Attorney, Agent, or Firm* — Maginot, Moore & Beck LLP

(57) ABSTRACT

The disclosure presents an efficient method for improving the aesthetic quality of noisy room segments corresponding to a scanned environment, such as those used by mobile robots to navigate an environment to perform a task. Room polygons are extracted from the noisy room segments and visual scores of the extracted room polygons are assessed. Based on the visual score, low scoring room polygons are removed or merged. A polygon mesh is formed from the room segments, which is then simplified and aligned using efficient methods. Finally, room segments and boundaries between rooms are recovered to generate refined room segments from the polygon mesh. Compared to the noisy room segments, the refined room segments are better suited for visual presentation to users, such as in mobile applications for operating such mobile robots.

17 Claims, 12 Drawing Sheets

(56)                    References Cited

U.S. PATENT DOCUMENTS

| | | | |
|---|---|---|---|
| 2004/0227750 | A1* | 11/2004 | Su .......................... G06T 11/203 |
| | | | 345/419 |
| 2019/0243928 | A1 | 8/2019 | Rejeb Sfar et al. |
| 2019/0302796 | A1* | 10/2019 | Watanabe ........... A47L 11/4061 |
| 2020/0202624 | A1* | 6/2020 | Szasz ......................... G06T 7/60 |
| 2022/0292306 | A1* | 9/2022 | Radhakrishnan ...... G06V 10/82 |
| 2025/0022179 | A1* | 1/2025 | Graziosi ................. G06T 7/187 |
| 2025/0166256 | A1* | 5/2025 | Wang ...................... G06F 30/13 |

OTHER PUBLICATIONS

Douglas et al., "Algorithms for the Reduction of the Number of Points Required to Represent a Digitized Line or its Caricature", 1973, 10(2), Cartographica, (13 Pages).

Wu et al., "A non-self-intersection Douglas-Peucker Algorithm", 2003, SIBGRAPI'03, IEEE Computer Society, (7 Pages).
Chalmeta et al., "Measuring regularity of convex polygons", 2013, pp. 93-104, Elsevier, Computer-Aided Design, doi: 10.1016/j.cad.2012.07.012.
Bormann et al., "Room Segmentation: Survey, Implementation, and Analysis", IEEE International Conference on Robotics and Automation (ICRA), May 16-21, 2016, pp. 1019-1026, Stockholm, Sweden.
Zeng et al., "Deep Floor Plan Recognition Using a Multi-Task Network with Room-Boundary-Guided Attention", Aug. 29, 2019, arXiv:1908.11025v1 (9 Pages).
Cheng et al., "Panoptic-DeepLab: A Simple, Strong, and Fast Baseline for Bottom-Up Panoptic Segmentation", Mar. 11, 2020, arXiv:1911.10194v3.
Liu et al., "An End-to-End Network for Panoptic Segmentation", Mar. 13, 2019, arXiv:1903.05027v2.

* cited by examiner

Input Noisy Room Segments

Output Refined Room Segments

200

210   Receive noisy room segments corresponding to a scanned environment.

220   Determine room polygons based on the noisy room segments.

230   Determine a polygon mesh based on the room polygons.

240   Generate refined room segments based on the polygon mesh.

Input Noisy Room Segments

Extracted Room Polygons

Refined Polygon Mesh

Input Noisy Room Segments

Output Refined Room Segments

SYSTEM AND METHODS FOR REFINING ROOM SEGMENTS TO IMPROVE AESTHETIC QUALITY FOR END-USER APPLICATIONS

FIELD

The device and method disclosed in this document relates to room segmentation and, more particularly, to refining room segments to improve aesthetic quality for end-user applications.

BACKGROUND

Unless otherwise indicated herein, the materials described in this section are not admitted to be the prior art by inclusion in this section.

Robot vacuums, and other mobile robots that navigate an environment to perform a task, are often operated using a software application, for example on a smart phone. In many cases, users are enabled to operate the mobile robot to perform operations on a per-room basis and the software application may provide a map visualization of the rooms in which the mobile robot can be operated. In many cases the mobile robots navigate the environment with the aid of a 2D LiDAR scan map. However, such 2D LiDAR scan maps tend to be noisy, incomplete, and generally not suitable for displaying to the user as a visualization of the of the rooms in which the mobile robot can be operated.

Generating aesthetically pleasing room segments from a noisy and incomplete 2D LiDAR scan map is a challenging task and an unsolved problem. A typical machine learning-based segmentation model might be used to segment the 2D LiDAR scan map into room segments. However, the direct output of such a model often remains noisy, incomplete, and not suitable for use in a user-facing software application. The direct output of such a model will often also contain small or ill-shaped segments, neither of which should be included in a final output to users. Instead, processed room segments with clean and smooth boundaries should be used for this application.

One technique that might be applied to assess the aesthetic quality of room segments is to measure regularity of convex polygons that form the room segments. However, the room segment polygons could be either convex or concave, such that this technique is not easily applied.

One technique that might be applied to improve the aesthetic quality of room segments is polyline simplification. Polyline simplification methods will simplify a polyline and generate a polyline with fewer points. However, these methods generally focus on a distance between a candidate point and an underlying main line, as well as preventing self-intersection. The simplified polylines are not necessarily vertically or horizontally aligned. Moreover, these methods work on individual polylines not a polygon mesh (e.g., multiple room segments that collectively form a floorplan). Directly using polyline simplification methods on a polygon mesh will break the topology of the polygon mesh. For example, in some cases, a point removed during the polyline simplification might break edges of adjacent polygons in the polygon mesh.

What is needed is a complete pipeline that will process noisy room segments, such as those provided by a machine learning model applied to a 2D LiDAR scan map, and generate aesthetically pleasing room segments having clean, smooth, and properly aligned boundaries, which are suitable for use in a user-facing in software application.

SUMMARY

A method for refining room segmentation of a scanned environment is disclosed. The method comprises receiving, with a processor, a plurality of input room segments corresponding to a scanned environment. The method further comprises determining, with the processor, a plurality of room polygons based on plurality of input room segments. The method further comprises determining, with the processor, a polygon mesh based on the plurality of room polygons. The method further comprises generating, with the processor, a plurality of refined room segments based on the polygon mesh.

BRIEF DESCRIPTION OF THE DRAWINGS

The foregoing aspects and other features of the system and methods are explained in the following description, taken in connection with the accompanying drawings.

DETAILED DESCRIPTION

Figure 1:
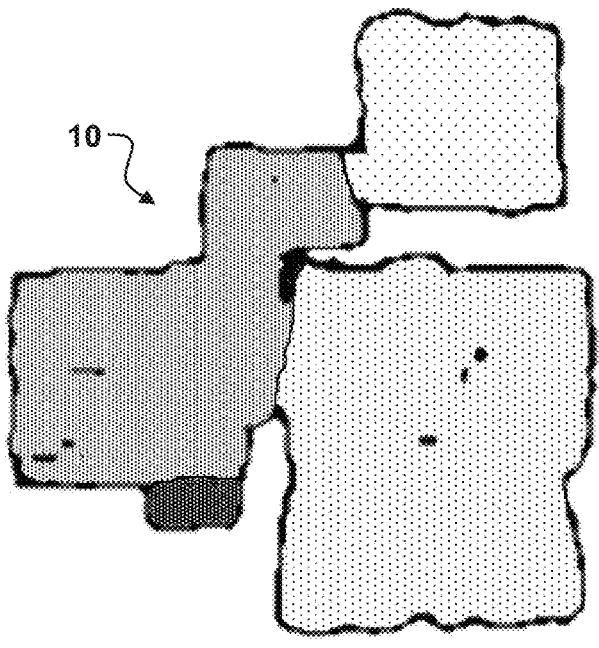
FIG. 1 summarizes a process in which noisy room segments are refined to provide refined room segments.
Figure 1:
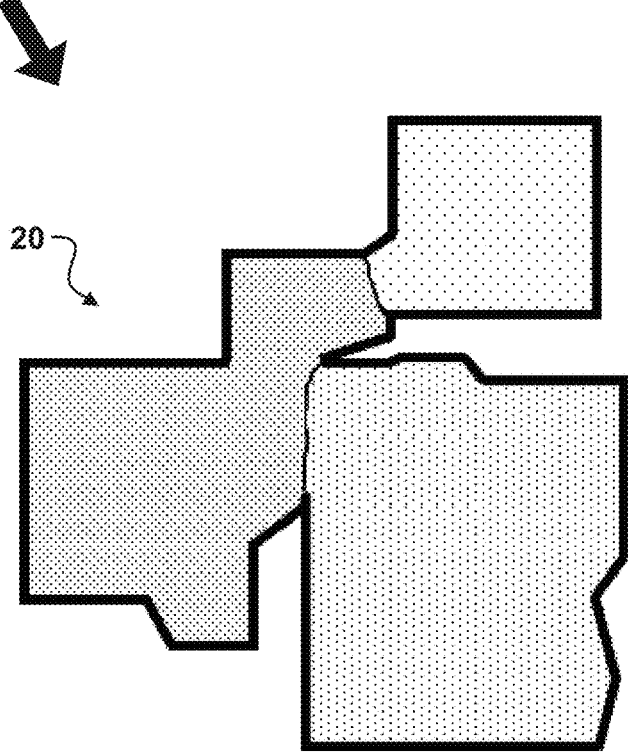

For the purposes of promoting an understanding of the principles of the disclosure, reference will now be made to the embodiments illustrated in the drawings and described in the following written specification. It is understood that no limitation to the scope of the disclosure is thereby intended. It is further understood that the present disclosure includes any alterations and modifications to the illustrated embodiments and includes further applications of the principles of the disclosure as would normally occur to one skilled in the art to which this disclosure pertains.

Overview

FIG. 1 summarizes a process in which noisy room segments 10 are refined to provide refined room segments 20. As used herein, "room segments" refer to map data of an indoor environment that is segmented into distinct rooms. In many applications, such room segments are generated on the basis of noisy map data. For example, the noisy map data may take the form of a sensor-generated point cloud, in which each individual point indicates a position in the environment at which a wall, object, or other obstruction was detected by a sensor. A machine learning-based segmentation model may be applied to the noisy map data to segment the noisy map data into distinct rooms. However, the resulting room segments may also be noisy.

The disclosure presents an efficient method for improving the aesthetic quality of noisy room segments. It should be appreciated that, as used herein, the term "aesthetic quality" does not refer merely to a subjective quality of room segments, of polygons, or of polygon meshes. Instead, as used herein, improving the "aesthetic quality" of the room segments refers to an appropriate reduction in complexity and noise in room segments, or polygons, or of polygon meshes, such that they have fewer edges and vertices, straighter edges, and edges that are generally more aligned relative to one another, thereby better representing the scanned environment. Particularly, it will be appreciated that a vast majority of indoor environments are formed by several straight walls. Accordingly, when presented visually, the noisiness of the noisy room segments 10 is quite apparent and conflicts with user expectations. Even if it may be the case that the noisy room segments 20 are functional for their purpose, they can nonetheless provide a poor impression to end users. Moreover, in many cases, the noisy room segments 20 are, at least by some metrics, a less wholistically accurate representation of the environment from which the noisy room segments were derived. To this end, the methods described herein seek to provide refined room segments 20.

In at least some embodiments, the map data is originally collected by a mobile robot 120 that autonomously navigates an environment to perform a task. Particularly, in some embodiments, the mobile robot 120 may comprise a robot vacuum or a robot mop that is configured to navigate the environment to clean a floor surface in the environment. In general, the mobile robot 120 include one or more sensors that are operated to detect positions of walls, objects, or other obstructions in the environment, as the mobile robot 120 navigates the environment.

After the map data is collected by the mobile robot 120, it is segmented to provide the noisy room segments 10. This segmentation may occur locally by the mobile robot 120 itself or, alternatively, by a cloud backend 150 or a personal electronic device 170 that are in communication with the mobile robot 120. A variety of room segmentation model or techniques may be utilized, which may or may not leverage machine learning. To output high-quality room segments using non-machine learning-based methods would generally require a clean and complete 2D floor plan, which is not available in many applications. Likewise, to output high-quality room segments using machine learning-based methods would generally require a very large amount of annotated map data, which is also not available in many applications. As a result, the room segmentation methods that are likely to be used in practice are not capable of providing high-quality, clean room segments, and instead provide noisy room segments 10 that are not well suited for visual presentation to end users. As can be seen, the boundaries of the noisy room segments 10 are not smooth and are not aesthetically appealing.

According to the disclosure, after the initial segmentation, the noisy room segments 10 are converted to refined room segments 20, using the methods described herein. Unlike the noisy room segments 10, the refined room segments 20, which may also be referred to herein as "refined room segments," have clean, smooth, and generally straight boundaries. The refined room segments 20 may be visually presented to an end user of the mobile robot 120 for a variety of purposes, such as enabling the end user to select a particular room to be cleaned, in the case of a robot vacuum or a robot mop. By using the refined room segments 20 for such end user features, the user is provided with a more aesthetically pleasing experience that provides confidence in the accuracy of the mapping of the mobile robot 20.

Mobile Robot

Figure 2A:
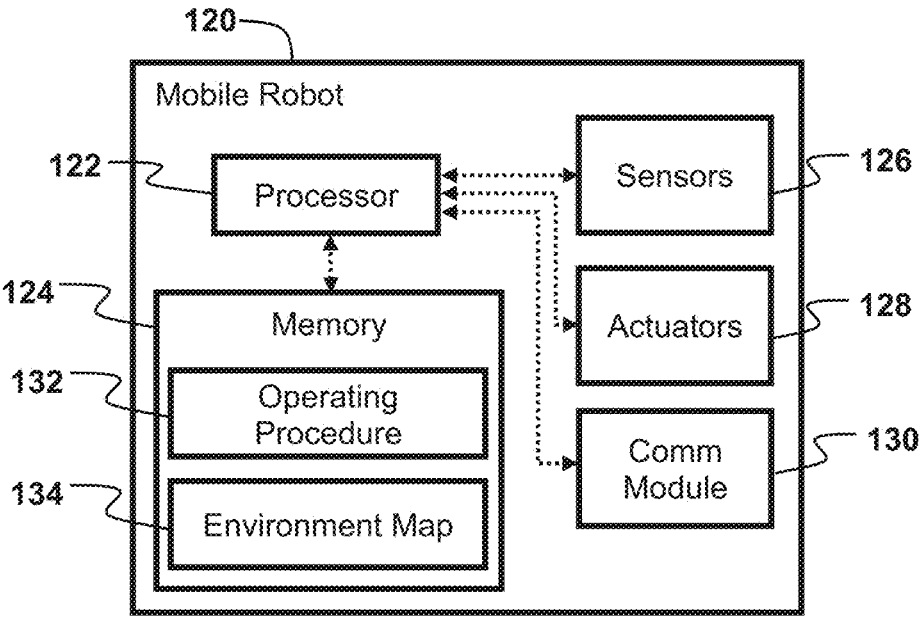
FIG. 2A shows an exemplary embodiment of a mobile robot.

FIG. 2A shows an exemplary embodiment of the mobile robot 120. In the illustrated embodiment, the mobile robot 120 comprises, for example, a processor 122, a memory 124, one or more sensors 126, one or more actuators 128, and at least one network communication module 130. It will be appreciated that the illustrated embodiment of the mobile robot 120 is only one exemplary embodiment and is merely representative of any of various manners or configurations of mobile robots that autonomously navigate an environment to perform a task.

The processor 122 is configured to execute instructions to operate the mobile robot 120 to enable the features, functionality, characteristics and/or the like as described herein. To this end, the processor 122 is operably connected to the memory 124, the one or more sensors 126, and the one or more actuators 128. The processor 122 generally comprises one or more processors which may operate in parallel or otherwise in concert with one another. It will be recognized by those of ordinary skill in the art that a "processor" includes any hardware system, hardware mechanism or hardware component that processes data, signals or other information. Accordingly, the processor 122 may include a system with a central processing unit, graphics processing units, multiple processing units, dedicated circuitry for achieving functionality, programmable logic, or other processing systems.

The memory 124 is configured to store data and program instructions that, when executed by the processor 122, enable the mobile robot 120 to perform various operations described herein. The memory 124 may be any type of device capable of storing information accessible by the processor 122, such as a memory card, ROM, RAM, hard drives, discs, flash memory, or any of various other computer-readable media serving as data storage devices, as will be recognized by those of ordinary skill in the art. As discussed in further detail below, the processor 122 is configured to execute program instructions of an operating procedure 132, which is stored in the memory 124, to navigate the environment to perform a task, such as cleaning a floor surface in the environment. In at least one embodiment, the operating procedure 132 utilizes an environment map 134 that virtually represents the environment to aid in performing the task.

The one or more sensors 126 may comprise a variety of different sensors. In some embodiments, the sensors 126 include sensors configured to measure one or more accelerations, rotational rates, and/or orientations of the mobile robot 120. In one embodiment, the sensors 126 include one or more accelerometers configured to measure linear accelerations of the mobile robot 120 along one or more axes (e.g., roll, pitch, and yaw axes), or more gyroscopes configured to measure rotational rates of the mobile robot 120 along one or more axes (e.g., roll, pitch, and yaw axes), and/or an inertial measurement unit configured to measure all of the above.

In at least some embodiments, the sensors 126 include a light sensor (e.g., LiDAR or any other time of flight or structured light-based sensor), configured to emit measurement light (e.g., lasers) and receive the measurement light after it has reflected throughout the environment. In time-of-flight based embodiments, the processor 122 is configured to calculate times of flight and/or return times for the measurement light. Based on the calculated times of flight and/or return times, the processor 122 may for example generate the environment map 134 in the form of a point cloud or raster map. In structured light-based embodiments, the processor 122 applies an algorithm to extract a 3D profile of surfaces onto which the structured light is projected (e.g., based on a fringe pattern generated on a surface).

In some embodiments, the sensors 126 include, as an alternative to the light sensor or in addition thereto, one or more cameras configured to capture a plurality of images of the environment as the mobile robot 120 navigates through the environment. The camera(s) generate image frames of the environment, each of which comprises a two-dimensional array of pixels. Each pixel has corresponding photometric information (intensity, color, and/or brightness). In some embodiments, the camera(s) are configured to generate RGB-D images in which each pixel has corresponding photometric information and geometric information (depth and/or distance). In such embodiments, the camera(s) may, for example, take the form of two RGB cameras configured to capture stereoscopic images, from which depth and/or distance information can be derived, or an RGB camera with an associated IR camera configured to provide depth and/or distance information. Based on RGB-D images captured as the mobile robot 120 navigates the environment, a map of the environment can be derived, for example using visual and/or visual-inertial odometry methods such as simultaneous localization and mapping (SLAM) techniques.

The one or more actuators 128 at least include motors of a locomotion system that, for example, drive a set of wheels to cause the mobile robot 120 to move throughout the environment to perform the task. Additionally, in some embodiments, the one or more actuators 128 include a vacuum suction system configured to vacuum a floor surface as the mobile robot 120 navigates through the environment. Mobile robots 20 that perform other tasks in the environment may, of course, include different types of actuators 128 that are suitable to other tasks.

The network communications module 130 may comprise one or more transceivers, modems, processors, memories, oscillators, antennas, or other hardware conventionally included in a communications module to enable communications with various other devices, at least including the cloud backend 150 and/or the personal electronic device 170. Particularly, the network communications module 130 generally includes a Wi-Fi module configured to enable communication with a Wi-Fi network and/or Wi-Fi router (not shown). Additionally, the network communications module 130 may include a Bluetooth® module (not shown) configured to enable communication with the personal electronic device 170. Finally, the network communications module 130 may include one or more cellular modems configured to communicate with wireless telephony networks.

The mobile robot 120 may also include a respective battery or other power source (not shown) configured to power the various components within the mobile robot 120. In one embodiment, the battery of the mobile robot 120 is a rechargeable battery configured to be charged when the mobile robot 120 is connected to a base station that is configured for use with the mobile robot 120.

Cloud Backend

As referenced above, in at least some embodiments, the mobile robot 120 may be in communication with a cloud backend 150. Particularly, the cloud backend 150 may be configured to store the accumulated map data that is collected by the mobile robot 120, and perform the initial room segmentation of the map data and/or the room segment refinement described herein. However, it should be appreciated that these functions can likewise be completed locally using the mobile robot 120 itself.

Figure 2B:
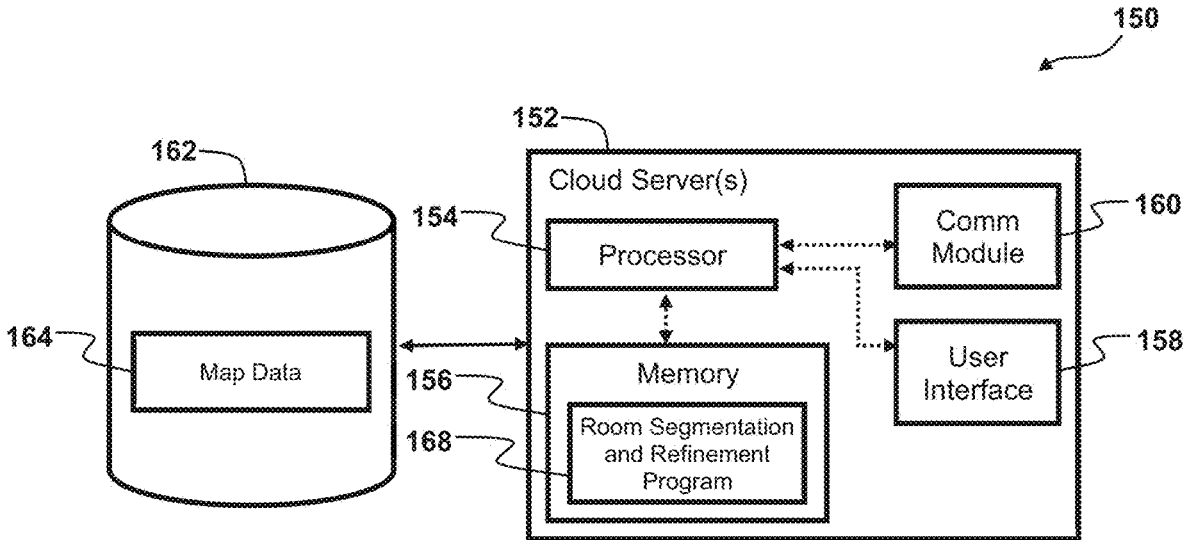
FIG. 2B shows an exemplary embodiment of a cloud backend.

FIG. 2B shows an exemplary embodiment of the cloud backend 150 that, in at least some embodiments, performs the room segment refinement described herein. The cloud backend 150 comprises one or more cloud servers 152 and one or more cloud storage devices 162. The cloud servers 152 may include servers configured to serve a variety of functions for the cloud storage backend 150, including web servers or application servers depending on the features provided by the cloud backend 150, but at least include one or more database servers configured to manage map data received from the mobile robot 120 and stored in the cloud storage devices 162. Each cloud server 152 includes, for example, a processor 154, a memory 156, a user interface 158, and a network communications module 160. It will be appreciated that the illustrated embodiment of the cloud servers 152 is only one exemplary embodiment of a cloud server 152 and is merely representative of any of various manners or configurations of a personal computer, server, or any other data processing system that is operative in the manner set forth herein.

The processor 154 is configured to execute instructions to operate the cloud server 152 to enable the features, functionality, characteristics and/or the like as described herein. To this end, the processor 154 is operably connected to the memory 156, the user interface 158, and the network communications module 160. The processor 154 generally comprises one or more processors which may operate in parallel or otherwise in concert with one another. It will be recognized by those of ordinary skill in the art that a "processor" includes any hardware system, hardware mechanism or hardware component that processes data, signals or other information. Accordingly, the processor 154 may include a system with a central processing unit, graphics processing units, multiple processing units, dedicated circuitry for achieving functionality, programmable logic, or other processing systems.

The cloud storage device 162 is configured to store map data received from the mobile robot 120. The cloud storage device 162 may be any type of long-term non-volatile storage device capable of storing information accessible by the processor 154, such as hard drives, solid-state drives, or any of various other computer-readable storage media recognized by those of ordinary skill in the art. Likewise, the memory 156 is configured to store program instructions that, when executed by the processor 154, enable the cloud server 152 to perform various operations described herein, including managing the map data stored in the cloud storage devices 162. The memory 156 may be any type of device or combination of devices capable of storing information accessible by the processor 154, such as memory cards, ROM, RAM, hard drives, discs, flash memory, or any of various other computer-readable media recognized by those of ordinary skill in the art.

The cloud server 152 may be operated locally or remotely by an administrator. To facilitate local operation, the cloud server 152 may include the user interface 158. In at least one embodiment, the user interface 158 may suitably include an LCD display screen or the like, a mouse or other pointing device, a keyboard or other keypad, speakers, and a microphone, as will be recognized by those of ordinary skill in the art. Alternatively, in some embodiments, an administrator may operate the cloud server 152 remotely from another computing device which is in communication therewith via the network communications module 160 and has an analogous user interface.

The network communications module 160 provides an interface that allows for communication with any of various devices, at least including the mobile robot 120 and the personal electronic device 170. In particular, the network communications module 160 may include a local area network port that allows for communication with any of various local computers housed in the same or nearby facility. Generally, the cloud server 152 communicates with remote computers over the Internet via a separate modem and/or router of the local area network. Alternatively, the network communications module 160 may further include a wide area network port that allows for communications over the Internet. In one embodiment, the network communications module 160 is equipped with a Wi-Fi transceiver or other wireless communications device. Accordingly, it will be appreciated that communications with the cloud server 152 may occur via wired communications or via the wireless communications. Communications may be accomplished using any of various known communications protocols.

The cloud server 152 is configured to store and manage map data for the mobile robot 120 in a secure way and to provide access to the map data by the mobile robot 120 and by the personal electronic device 170. Additionally, in some embodiments, the memory 156 stores program instructions of a room segmentation and refinement program 168 for performing the initial room segmentation of the received map data and/or the performing the room segment refinement described herein.

Personal Electronic Device

As referenced above, in at least some embodiments, the mobile robot 120 may be in communication with a personal electronic device 170, such as a mobile phone or tablet computer, via which a user can manage and operate the mobile robot 120. The refined room segments 30 discussed herein may be presented visually to the user via an associated application on the personal electronic device 170. Such an application might also be used to operate and configure the mobile robot 120. However, it should be appreciated that these functions can likewise be completed locally using the mobile robot 120 itself, such as using a user interface integrated with the mobile robot 120.

Figure 2C:
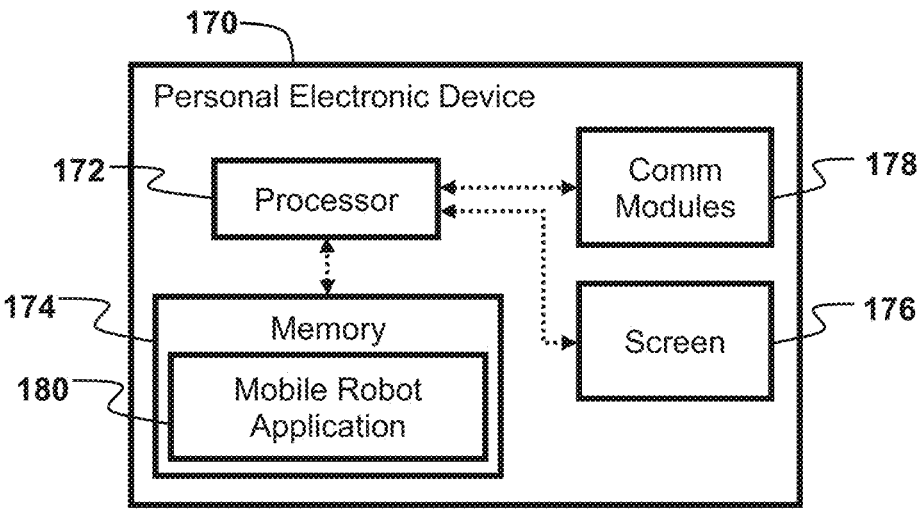
FIG. 2C shows an exemplary embodiment of a personal electronic device.

FIG. 2C shows an exemplary embodiment of the personal electronic device 170. the personal electronic device 170 comprises a processor 172, a memory 174, a display screen 176, and at least one network communications module 178. The processor 172 is configured to execute instructions to operate the personal electronic device 170 to enable the features, functionality, characteristics and/or the like as described herein. To this end, the processor 172 is operably connected to the memory 174, the display screen 176, and the network communications module 178. The processor 172 generally comprises one or more processors which may operate in parallel or otherwise in concert with one another. It will be recognized by those of ordinary skill in the art that a "processor" includes any hardware system, hardware mechanism or hardware component that processes data, signals or other information. Accordingly, the processor 172 may include a system with a central processing unit, graphics processing units, multiple processing units, dedicated circuitry for achieving functionality, programmable logic, or other processing systems.

The memory 174 is configured to store data and program instructions that, when executed by the processor 172, enable the personal electronic device 170 to perform various operations described herein. The memory 174 may be any type of device capable of storing information accessible by the processor 172, such as a memory card, ROM, RAM, hard drives, discs, flash memory, or any of various other computer-readable media serving as data storage devices, as will be recognized by those of ordinary skill in the art. Among other things, the memory 174 stores a mobile robot application 180. As discussed in further detail below, the processor 172 is configured to execute program instructions of the mobile robot application 180 to operate and configure the mobile robot 120.

The display screen 176 may comprise any of various known types of displays, such as LCD or OLED screens. In some embodiments, the display screen 176 may comprise touch screens configured to receive touch inputs from a user. Alternatively, or in addition, the personal electronic device 170 may include additional user interfaces, such as buttons, switches, a keyboard or other keypad, speakers, and a microphone.

The network communications module 178 may comprise one or more transceivers, modems, processors, memories, oscillators, antennas, or other hardware conventionally included in a communications module to enable communications with various other devices, at least including the cloud backend 150 and/or the mobile robot 120. Particularly, the network communications module 178 generally includes a Wi-Fi module configured to enable communication with a Wi-Fi network and/or Wi-Fi router (not shown). Additionally, the network communications module 178 may include a Bluetooth® module (not shown) configured to enable communication with the mobile robot 120. Finally, the network communications module 178 may include one or more cellular modems configured to communicate with wireless telephony networks.

Methods for Refining Room Segments to Improve Aesthetic Quality

A variety of methods and processes are described below for refining room segments to improve aesthetic quality. In these descriptions, statements that a method, processor, and/or system is performing a task or function refers to a controller or processor (e.g., the processor 154 of the cloud server 152, the processor 122 of the mobile robot 120, or the processor 172 of the personal electronic device 170) executing programmed instructions stored in non-transitory computer readable storage media (e.g., the memory 156 of the cloud server 152, the memory 124 of the mobile robot 120, or the memory 174 of the personal electronic device 170) operatively connected to the controller or processor to manipulate data or to operate one or more components in the cloud server 152, the mobile robot 120, or the personal electronic device 170 to perform the task or function. Additionally, the steps of the methods may be performed in any feasible chronological order, regardless of the order shown in the figures or the order in which the steps are described.

Figure 3:
FIG. 3 shows a flow diagram for a method for refining room segmentation of a scanned environment to improve aesthetic quality.
Figure 3:
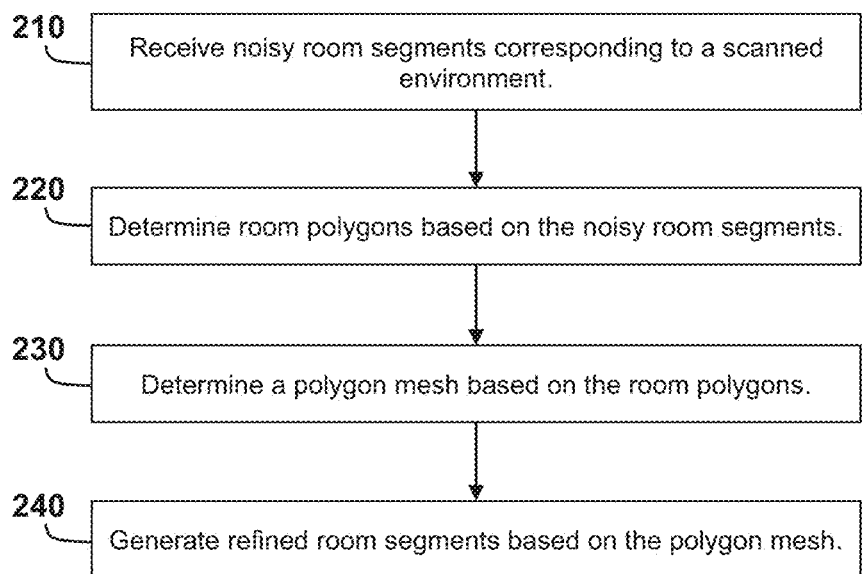

FIG. 3 shows a flow diagram for a method 200 for refining room segmentation of a scanned environment to improve aesthetic quality. The method 200 advantageously provides a pipeline to process noisy room segments and generate room segments with clean and smooth boundaries, referred to herein as refined room segments. The method 200 advantageously adopts an efficient method to assess a visual score of convex and concave polygons extracted from the noisy room segments for further processing. Next, the method 200 advantageously adopts an efficient method to generate, simplify, and align a polygon mesh formed from the room polygons. Finally, the method 200 advantageously adopts an efficient method to recover room segments and boundaries between rooms to generate refined room segments.

The method 200 will be described generally as being performed remotely by the cloud backend 150 on the basis of data received from the mobile robot 120. However, it should be appreciated that the method 200 may alternatively be performed locally by the mobile robot 120 itself or by the personal electronic device 170.

The method 200 begins with receiving noisy room segments corresponding to a scanned environment (block 210). Particularly, the processor 154 of the cloud backend 150 operates the network communication module 160 to receive noisy room segments from the mobile robot 120 or from the personal electronic device 170. Alternatively, in some embodiments, the cloud backend 150 receives map data from which the noisy room segments may be derived. In at least some embodiments, the map data is originally collected by the mobile robot 120 as it autonomously navigates an environment to perform a task. After the map data is collected by the mobile robot 120, it is segmented to provide the noisy room segments, for example using a machine learning-based segmentation model. As mentioned above, this initial segmentation may occur locally by the mobile robot 120 itself or, alternatively, by the cloud backend 150 or the personal electronic device 170. Each noisy room segment has a defined area with defined boundaries and has a corresponding room segment identifier (e.g., "room 1," "room 2," etc.).

The method 200 begins with determining room polygons based on the noisy room segments (block 220). Particularly, the processor 154 determines a plurality of refined room polygons based on the noisy room segments. To determine the plurality of refined room polygons, the processor 154 first extracts a plurality of extracted room polygons from the noisy room segments. Each room polygon corresponds to the boundaries of an individual room segment. In at least one embodiment, the processor 154 extracts the plurality of extracted room polygons by applying a contour detection technique/algorithm to the noisy room segments.

Figure 4:
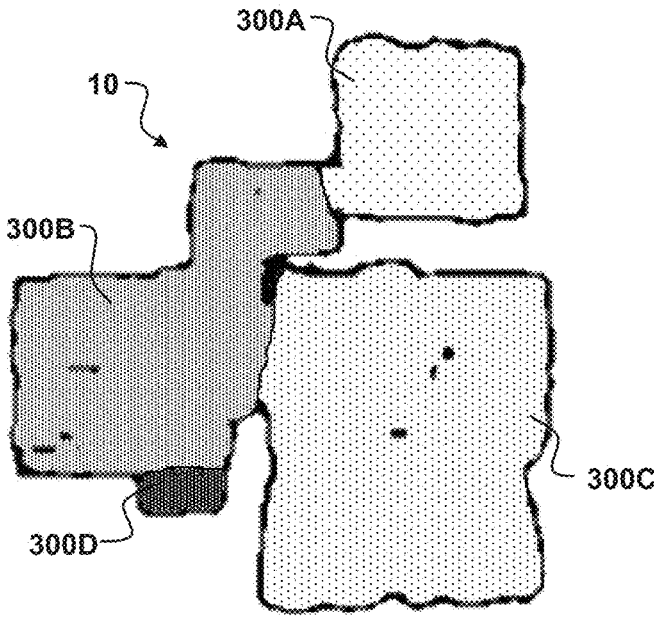
FIG. 4 illustrates a process for extracting room polygons from the noisy room segments.
Figure 4:
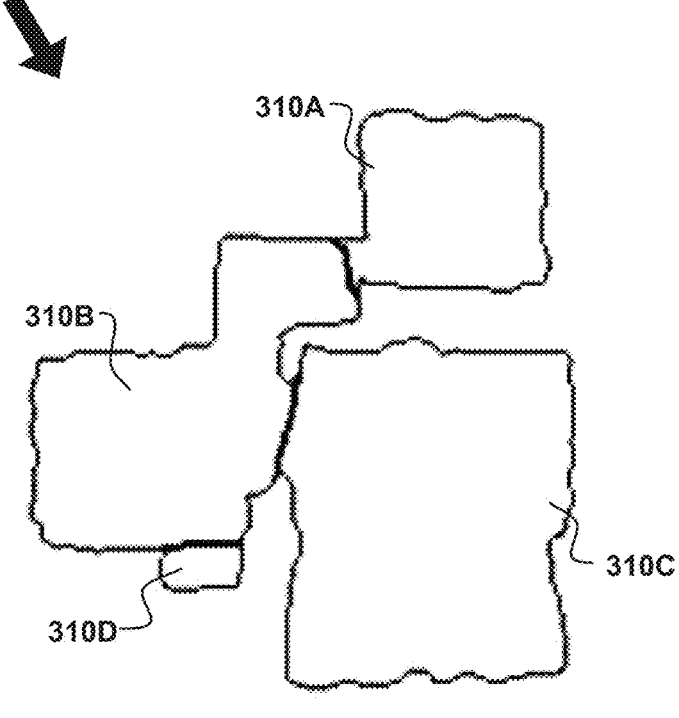

FIG. 4 illustrates a process for extracting room polygons from the noisy room segments. As can be seen, the noisy room segments 10 include four distinct room segments 300A-D. The room segments 300A-D are converted into corresponding room polygons 310A-D. In each case, the room polygons 310A-D correspond to the boundaries of the respective room segment 300A-D. However, since the room segments 300A-D were noisy, the resulting room polygons 310A-D are ill-shaped, including excessive numbers of edges and vertices. Additionally, the room polygon 310D is very small.

After the initial extraction of room polygons, the processor 154 generates the plurality of refined room polygons by refining the plurality of extracted room polygons. To this end, in some cases, the processor 154 removes one or more extracted room polygons from the plurality of extracted room polygons. Additionally, in other cases, the processor 154 merges two or more extracted room polygons from the plurality of extracted room polygons.

In some embodiments, in order to assess which room polygons should be left unchanged, removed, or merged with adjacent polygons, the processor 154 determines a respective visual score for each respective extracted room polygon in the plurality of extracted room polygons. Based on this visual score, the processor 154 determines whether the respective extracted room polygon should be left unchanged, removed, or merged with an adjacent intersecting polygon.

Figure 5:
FIG. 5 shows a flow diagram for a method for refining room polygons initially extracted from the noisy room segments.
Figure 5:
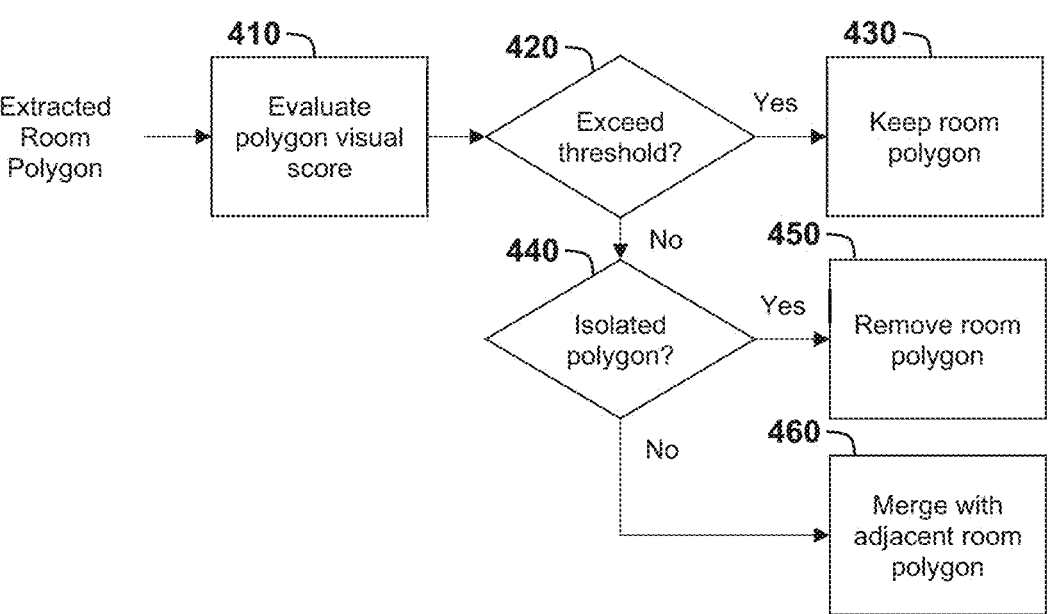

FIG. 5 shows a flow diagram for a method 400 for refining room polygons initially extracted from the noisy room segments. For each respective extracted room polygon P, the processor 154 determines a visual score S for the respective extracted room polygon P (block 410). In some embodiments, the processor 154 determines the visual score S based on a percentage of a rotated bounding box around the room polygon P that is occupied by the room polygon P.

To this end, the processor 154 determines a smallest rotated bounding box $\beta$ that can encompass the room polygon P. Next, the processor 154 calculates an area $A_p$ of the room polygon P and an area $A_\beta$ of the rotated bounding box $\beta$. The processor 154 determines an area percentage based on the area $A_p$ of the room polygon P and the area $A_\beta$ of the rotated bounding box $\beta$, i.e.

$$\frac{A_p}{A_\beta}.$$

In at least some embodiments, the processor 154 determines the visual score S based on the area percentage $$\frac{A_p}{A_\beta}.$$

Figure 6:
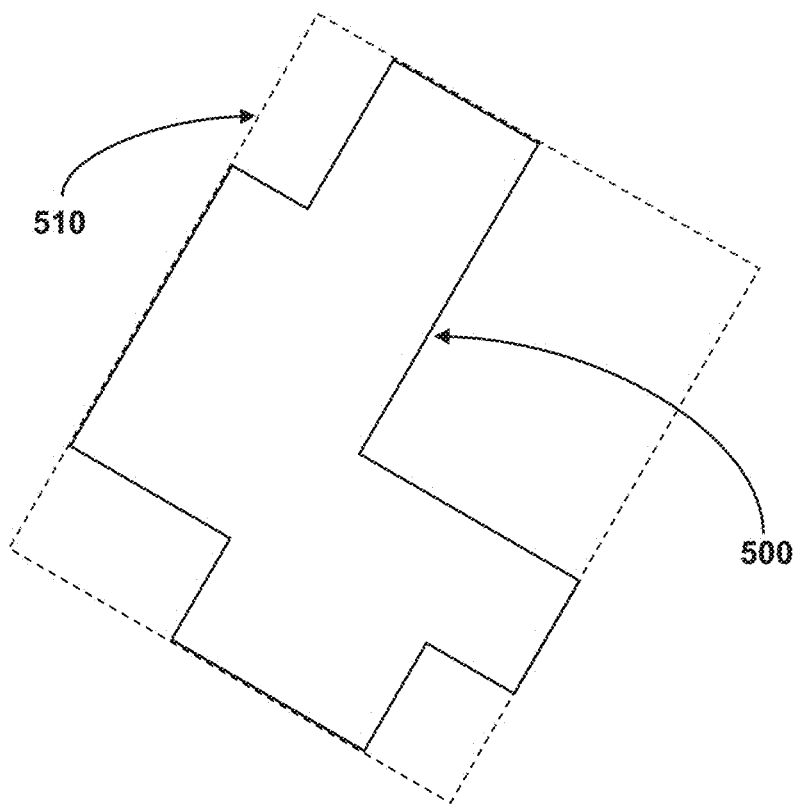
FIG. 6 shows an exemplary room polygon and rotated bounding box.

FIG. 6 shows an exemplary room polygon and rotated bounding box. As can be seen, a room polygon 500 has an irregular shape. A rotated bounding box 510 is defined that tightly encompasses the room polygon 500. It should be appreciated that an infinite number of bounding boxes can be defined that encompass the room polygon 500. However, the processor 154 identifies the rotated bounding box 510 that encompass the room polygon 500 with the smallest area or, in other words, identifies a rotation that enables the bounding box 510 to be as small as possible, while still encompassing the room polygon 500.

In at least some embodiments, in addition to the area percentage $$\frac{A_p}{A_\beta},$$

the processor 154 further calculates a shape index according to $$\min\left(\frac{A_p}{A_\alpha}, 1\right),$$

where $A_\alpha$ is an area of a square with side size equals $$\left(\frac{w_\beta + h_\beta}{2}\right),$$

$w_\beta$ is a width of the rotated bounding box $\beta$, and $h_\beta$ is a height of the rotated bounding box $\beta$. The processor 154 determines the visual score S based on the area $A_p$ of the room polygon P, the area $A_\beta$ of the rotated bounding box $\beta$, and the shape index $$\min\left(\frac{A_p}{A_\alpha}, 1\right).$$

In one embodiment, the processor 154 determines the visual score S according to a weighted summation:

$$S = W_{shape}\min\left(\frac{A_p}{A_\alpha}, 1\right) + W_{percent}\left(\frac{A_p}{A_\beta}\right)$$

$$W_{shape} + W_{percent} = 1$$

$$A_\alpha = \left(\frac{w_\beta + h_\beta}{2}\right)^2$$

where $W_{shape}$ is a shape index factor weight and $W_{percent}$ is an area percent factor weight, resulting in a visual score S with a value in between zero and one.

Returning to FIG. 5, the processor 154 checks if the visual score S for the respective extracted room polygon exceeds a threshold value $S_{threshold}$ (block 420). In response to the visual score S for the respective extracted room polygon being greater than the threshold value $S_{threshold}$, the processor 154 keeps the respective extracted room polygon unchanged and includes it in the set of refined room polygons for further processing (block 430).

In response to the visual score S for the respective extracted room polygon being less than the threshold value $S_{threshold}$, the processor 154 checks whether the respective extracted room polygon is isolated from each other extracted room polygon (block 440). In response to the respective extracted room polygon being isolated from each other extracted room polygon, the processor 154 removes or ignores the respective extracted room polygon, thereby excluding the respective extracted room polygon from the set of refined room polygons for further processing (block 450). In response to the respective extracted room polygon intersecting with at least one other extracted room polygon, the processor 154 merges the respective extracted room polygon with at least one of the adjacent extracted room polygons with which the respective extracted room polygon intersects, and includes the merged room polygon in the set of refined room polygons for further processing (block 460).

Figure 7:
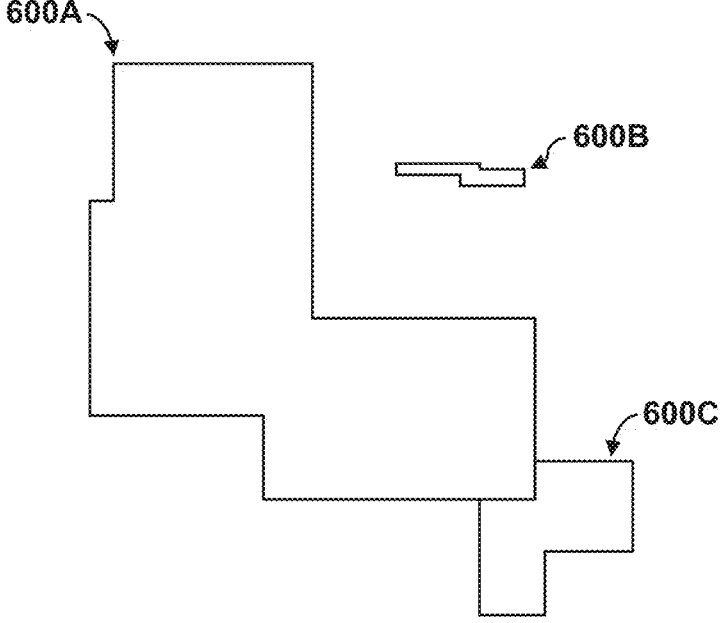
FIG. 7 shows exemplary room polygons during evaluation of the visual scores.

FIG. 7 shows exemplary room polygons during evaluation of the visual scores. In the example, three simple room polygons 600A-C are shown. On the left, the largest room polygon 600A is determined to have a visual score that exceeds the threshold value and will be kept. On the right, a small elongated room polygon 600B is determined to have a visual score that falls below the threshold value. Since the room polygon 600B is isolated from the other room polygons 600A and 600C, the room polygon 600B will be removed. Finally, at the bottom-right, a small room polygon 600C is also determined to have a visual score that falls below the threshold value. However, since the room polygon 600C intersects with the room polygon 600A, the room polygon 600C will be merged with the adjacent room polygon 600A.

With returning reference to FIG. 3, the method 200 begins with determining a polygon mesh based on the room polygons (block 230). Particularly, the processor 154 determines a polygon mesh based on the refined plurality of room polygons. To this end, the processor 154 determines vertices of the polygon mesh by merging adjacent polygon vertices of the plurality of refined room polygons. Additionally, or alternatively, the processor 154 determines edges of the polygon mesh by merging adjacent polygon edges of the plurality of refined room polygons. Next, the processor 154 refines the polygon mesh by mesh simplification and edge alignment, thereby arriving at a refined polygon mesh.

Figure 8:
FIG. 8 shows a flow diagram for a method for generating a refined polygon mesh from a plurality of room polygons.
Figure 8:
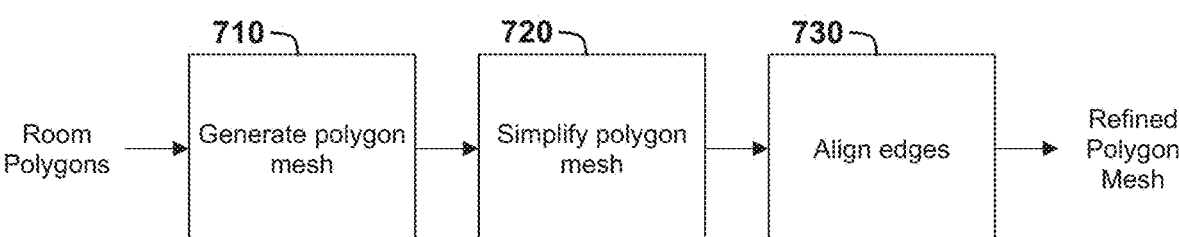

FIG. 8 shows a flow diagram for a method 700 for generating a refined polygon mesh from a plurality of room polygons. First, the processor 154 generates an initial polygon mesh by merging adjacent vertices in the plurality of room polygons as a single vertex in the polygon mesh (block 710). In one embodiment, the processor 154 determines that two vertices should be merged if they are within a threshold distance from one another.

Next, the processor 154 simplifies the polygon mesh (block 720). In at least some embodiments, the processor 154 simplifies the initial polygon mesh by removing at least one vertex from the initial polygon mesh. In one embodiment, the processor 154 identifies vertices to be removed using an iterative polyline simplification algorithm which removes polyline vertices if the distance between the vertex and an underlying main edge is more than the threshold. However, it should be appreciated that existing polyline simplification algorithms are only directly applicable to a single polyline or a single polygon. In applying the polyline simplification algorithm to each polygon in the initial polygon mesh, the processor 154 identifies starting and ending vertices such that the polygon may be treated as polyline.

However, direct application of existing polyline simplification algorithm may result in removal of a vertex that is shared by another polygon in the polygon mesh. To prevent this, the processor 154 first identifies any vertices of the respective polygon that are shared with another polygon in the polygon mesh, and flags these vertices in such a manner that they are not candidates for removal during the polyline simplification applied to the respective polygon. In other words, during the iterative polyline simplification process, shared vertices are ignored and not considered for deletion, whereas the remaining non-shared vertices are considered for deletion. In one embodiment, the processor 154 identifies shared vertices as one of the starting and ending vertices of the polyline, which generally will not be removed when polyline simplification algorithms are applied.

Figure 9:
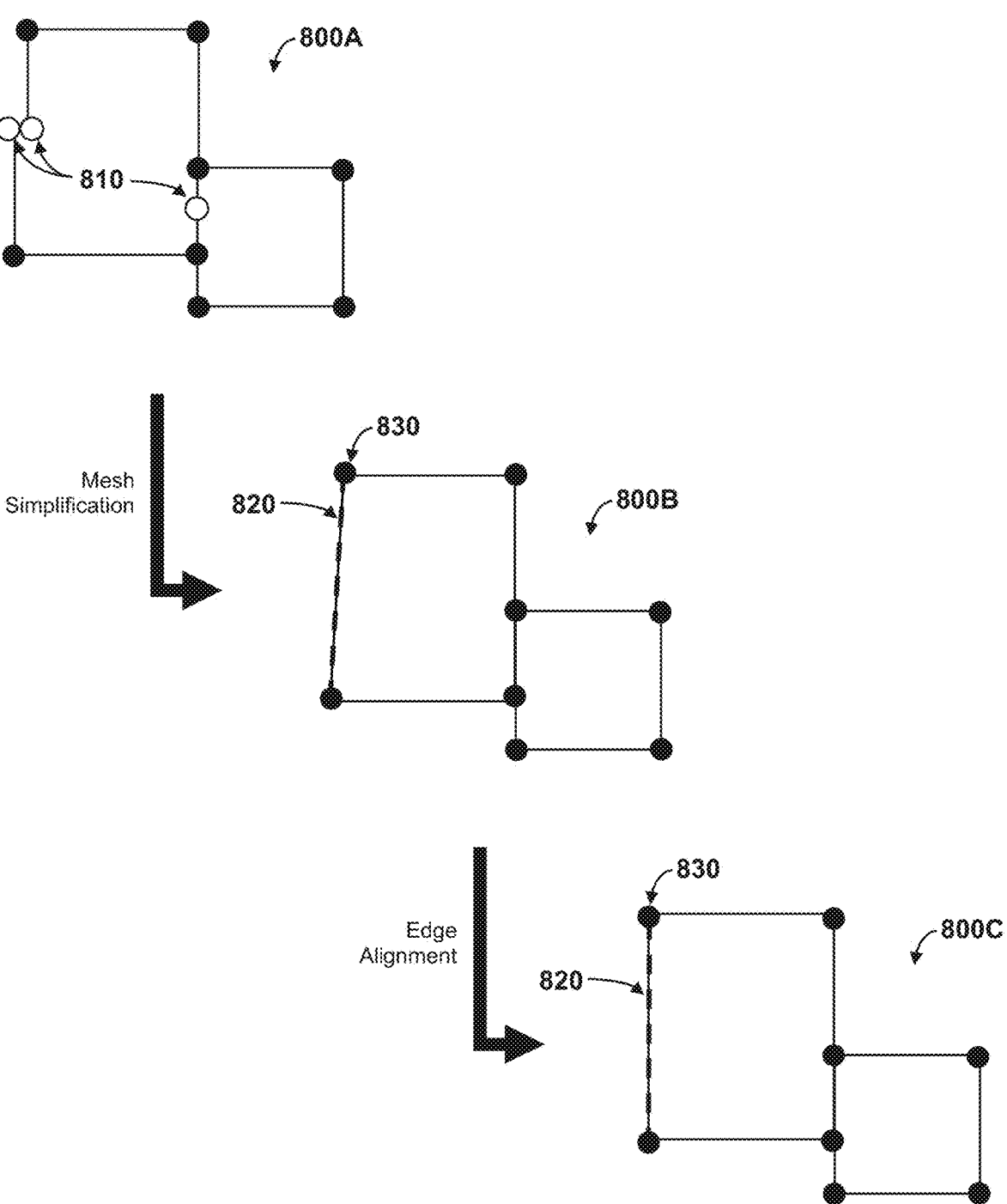
FIG. 9 shows an exemplary polygon mesh refinement process.

FIG. 9 shows an exemplary polygon mesh refinement process. An initial polygon mesh 800A that was formed from two distinct polygons, and which includes a plurality of vertices, illustrated as circles, and a plurality of edges, illustrated as lines. During mesh simplification, three vertices 810 are identified for removal. The vertices 810 identified for removal are illustrated as open circles, whereas the vertices to be kept are illustrated as solid circles. Once the vertices 810 are removed, a new edge 820 is generated that directly connects the remaining vertices that were previously connected indirectly via the removed vertices 810.

Returning to FIG. 8, after mesh simplification, the processor 154 performs edge alignment (block 730), thereby resulting in the refined polygon mesh. In at least some embodiments, the processor 154 performs edge alignment by aligning at least one edge of the polygon mesh with a horizontal or a vertical axis. Particularly, in one embodiment, the processor 154 identifies any edges in the polygon mesh that have a non-zero relative angle to a horizontal or a vertical axis that is less than a threshold angle (i.e., slanted edges that a near vertical or near horizontal).

Next, for each identified edge, the processor 154 adjusts the position of one or both vertices connected to the identified edge such that the near vertical identified edge becomes vertical or such that a near horizontal identified edge becomes horizontal. It should be appreciated that there are three options for aligning an identified edge: a first vertex connected to the identified edge can be repositioned, a second vertex connected to the identified edge can be repositioned, or both the first and second vertices of the identified edge can be repositioned. In some embodiments, the processor 154 repositions only one of the connected vertices so as to align the identified edge while increasing the area of the polygon. In other words, there is a bias in favor of expanding the area of the polygon, rather than reducing the area of the polygon during the alignment process. In an alternative embodiment, the processor 154 repositions both of the connected vertices so as to align the identified edge while maintaining the same area of the polygon. In other words, there is a bias in favor of maintaining a same area of the polygon during the alignment process.

Returning to FIG. 9, it can be seen that the edge 820 in the polygon mesh 800B is near vertical but slightly slanted. The edge 820 is aligned vertically by shifting the position of a vertex 830 to the left slightly, resulting in a refined polygon mesh 800C, which has been simplified and aligned. By shifting the position of a vertex 830 to the left slightly, the area of the polygon is slightly increased, which may be preferable to decreasing the area of the polygon by alternatively choosing to reposition the other vertex of the edge 820.

The method 200 begins with generating refined room segments based on the polygon mesh (block 240). Particularly, the processor 154 generates refined room segments based on the refined polygon mesh and the originally provided noisy room segments. The processor 154 generates refined room segments with shapes corresponding to the refined polygon mesh and with segment identifiers based on the input noisy room segments.

Firstly, for each respective room polygon in the refined polygon mesh, the processor 154 determines which room segment from the original noisy room segments to which the respective room polygon corresponds. In one embodiment, each room polygon is assigned a respective room segment identifier (e.g., "room 1," "room 2," etc.). To these ends, in one embodiment, the processor 154 considers a plurality of sample positions within the respective room polygon and, for each sample, determines a corresponding room segment identifier at that same position withing the noisy room segments (e.g., by overlaying the refined polygon mesh onto the noisy room segments). The processor 154 assigns a room segment identifier to the respective room polygon based on the most common corresponding room segment identifier among the plurality of samples.

Next, the processor 154 defines the room boundaries of the refined room segments based on the edges of the refined polygon mesh. However, it should be appreciated that the refined polygon mesh includes edges at locations that do not correspond to room boundaries (e.g., walls). Rather, some edges of the refined polygon mesh correspond only to a boundary between two room segments.

To resolve this, the processor 154 divides each edge into one or more fixed length boundary edge segments (e.g., 5-pixel segments). For each boundary edge segment, the processor 154 checks if the boundary edge segment lies between two rooms or lies between a room and outside. Particularly, if a respective boundary edge segment has, on one side, points labeled with a first segment identifier and, on the other side, points labeled with a second segment identifier, then the processor 154 determines that the respective boundary edge lies between two rooms and removes the respective boundary edge from the final refined room segments. Conversely, if a respective boundary edge segment lies has, on one side, points labeled with a first segment identifier and, on the other side, points not labeled with any segment identifier, then the processor 154 determines that the respective boundary edge is a real boundary edge and it is retained in the final refined room segments.

Figure 10:
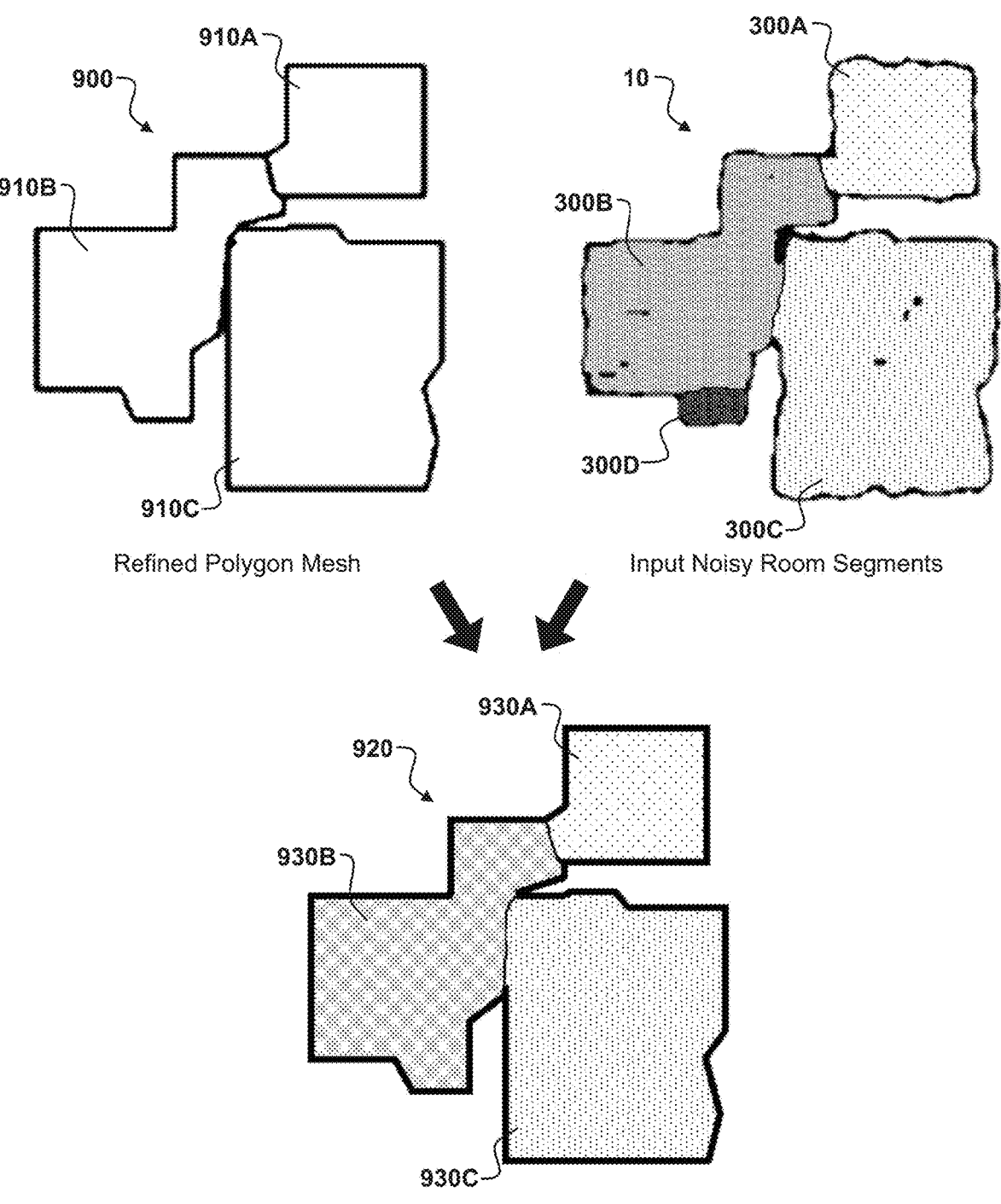
FIG. 10 illustrates a process for generating refined room segments from the refined polygon mesh and the original noisy room segments.

FIG. 10 illustrates a process for generating refined room segments from the refined polygon mesh and the original noisy room segments. As a result of the processes described above, a refined polygon mesh 900 was generated based on the noisy room segments 10. The refined polygon mesh 900 is formed from three distinct room polygons 910A-C. Each of the room polygons is a assigned a room identifier based on a comparison with the original noisy room segments 10. Particularly, the room polygon 910A corresponds entirely to the room segment 300A and is assigned the room identifier of the room segment 300A. Likewise, the room polygon 910C corresponds entirely to the room segment 300C and is assigned the room identifier of the room segment 300C. However, the room polygon 910B corresponds to both the room segment 300B and the room segment 300D. Nevertheless, since a majority of samples in the room polygon 910B correspond to the room segment 300B, the room polygon 910B is assigned the room identifier of the room segment 300B.

Based on the room identifiers assigned to each of the room polygons 910A-C, refined room segments 920 are generated, which consist of three distinct room segments 930A-C. As can be seen, in the refined room segments 920, boundary edge segments from the refined polygon mesh 900 that lie between the room segments 930A and 930B are removed, resulting in merely a boundary between room segments but no room boundary thereat. Likewise, boundary edge segments from the refined polygon mesh 900 that lie between the room segments 930B and 930C are similarly removed.

As previously discussed, the refined room segments are better suited for visual presentation to a user, compared to the noisy room segments. To this end, in at least some embodiments, the processor 154 of the cloud backend 150 operates the network communication module 160 to transmit the refined room segments to the mobile robot 120 and/or to the personal electronic device 170. The processor 172 of the personal electronic device 170 operates the display screen 176 to display a visual representation of the refined room segments to a user, e.g., within a graphical user interface of the mobile robot application 180.

In at least some embodiments, the user may interact with the graphical user interface of the mobile robot application 180 via a user interface of the personal electronic device 170 to select one or more of the refined room segments in which to operate the mobile robot 120 to perform operations on a per-room basis. In one example, the user selects a particular room by clicking on or tapping on the room within the visual representation of the refined room segments. Next, the user can select an option to cause the mobile robot 120 perform a task in the selected room (e.g., vacuum the floor of the room). In response to the user selection, the processor 172 operates the network communication module 178 to transmit a command message to the mobile robot 120. The processor 122 of the mobile robot 120 operates the network communication module 130 to receive the command message and operates the actuators 128 to navigate to the selected room and to perform the task in the selected room.

It should be appreciated, however, that the visual representation of the refined room segments can be used to enable a wide variety of other control operations, robot configurations, customizations, and the like within the graphical user interface of the mobile robot application 180. In another example, the visual representation of the refined room segments is displayed to the user as a visual reference for defining no-go zones within the environment that the mobile robot 120 should not enter when navigating the environment. In yet another example, real-time position tracking and historical pathing information of the mobile robot 120 may be overlaid upon the visual representation of the refined room segments, for the purpose of monitoring a progress of a task being performed by the mobile robot 120.

Embodiments within the scope of the disclosure may also include non-transitory computer-readable storage media or machine-readable medium for carrying or having computer-executable instructions (also referred to as program instructions) or data structures stored thereon. Such non-transitory computer-readable storage media or machine-readable medium may be any available media that can be accessed by a general purpose or special purpose computer. By way of example, and not limitation, such non-transitory computer-readable storage media or machine-readable medium can comprise RAM, ROM, EEPROM, CD-ROM or other optical disk storage, magnetic disk storage or other magnetic storage devices, or any other medium which can be used to carry or store desired program code means in the form of computer-executable instructions or data structures. Combinations of the above should also be included within the scope of the non-transitory computer-readable storage media or machine-readable medium.

Computer-executable instructions include, for example, instructions and data which cause a general-purpose computer, special purpose computer, or special purpose processing device to perform a certain function or group of functions. Computer-executable instructions also include program modules that are executed by computers in standalone or network environments. Generally, program modules include routines, programs, objects, components, and data structures, etc. that perform particular tasks or implement particular abstract data types. Computer-executable instructions, associated data structures, and program modules represent examples of the program code means for executing steps of the methods disclosed herein. The particular sequence of such executable instructions or associated data structures represents examples of corresponding acts for implementing the functions described in such steps.

While the disclosure has been illustrated and described in detail in the drawings and foregoing description, the same should be considered as illustrative and not restrictive in character. It is understood that only the preferred embodiments have been presented and that all changes, modifications and further applications that come within the spirit of the disclosure are desired to be protected.

What is claimed is:

1. A method for refining room segmentation of a scanned environment, the method comprising:
   receiving, with a processor, a plurality of input room segments corresponding to the scanned environment;
   extracting, with the processor, a plurality of extracted room polygons from the plurality of input room segments;

determining, with the processor, a respective score for each respective extracted room polygon in the plurality of extracted room polygons;
   generating, with the processor, a plurality of refined room polygons by, for each respective extracted room polygon in the plurality of extracted room polygons, (i) including the respective extracted room polygon in the plurality of refined room polygons in response to the respective score being greater than a threshold score, and (ii) excluding the respective extracted room polygon from the plurality of refined room polygons in response to the respective score being less than the threshold score and the respective extracted room polygon being isolated from each other extracted room polygon in the plurality of extracted room polygons;
   determining, with the processor, a polygon mesh based on the plurality of refined room polygons; and
   generating, with the processor, a plurality of refined room segments based on the polygon mesh.

2. The method according to claim 1, the extracting the plurality of extracted room polygons further comprising:
   extracting the plurality of extracted room polygons using a contour detection technique.

3. The method according to claim 1, the refining the plurality of extracted room polygons further comprising at least one of:
   removing at least one extracted room polygon from the plurality of extracted room polygons; and
   merging at least two extracted room polygons from the plurality of extracted room polygons.

4. The method according to claim 1, the refining the plurality of extracted room polygons further comprising, for each respective extracted room polygon in the plurality of extracted room polygons:
   determining whether the respective extracted room polygon is isolated from each other extracted room polygon in the plurality of extracted room polygons, in response to the respective score being less than the threshold score.

5. The method according to claim 1, the refining the plurality of extracted room polygons further comprising, for each respective extracted room polygon in the plurality of extracted room polygons:
   determining a merged room polygon by merging the respective extracted room polygon with an adjacent extracted room polygon of the plurality of extracted room polygons in response to (i) the respective score being less than the threshold score and (ii) the respective extracted room polygon intersecting with at least one other extracted room polygon in the plurality of extracted room polygons; and
   including the merged room polygon in the plurality of refined room polygons.

6. The method according to claim 1, the determining the respective score for the respective extracted room polygon further comprising:
   determining a rotated bounding box that encompasses the respective extracted room polygon with a smallest area; and
   determining the respective score based on (i) an area of the respective extracted room polygon and (ii) at least one of dimensions of the rotated bounding box and an area of the rotated bounding box.

7. The method according to claim 1, the determining the polygon mesh further comprising:

determining vertices of the polygon mesh by merging adjacent polygon vertices of the plurality of refined room polygons.

8. The method according to claim 1, the determining the polygon mesh further comprising:

simplifying the polygon mesh by removing vertices from the polygon mesh.

9. The method according to claim 8, the simplifying the polygon mesh further comprising, for each respective polygon in the polygon mesh:

selecting at least one vertex of the respective polygon to be removed using a polyline simplification technique.

10. The method according to claim 9, the simplifying the polygon mesh further comprising, for each respective polygon in the polygon mesh:

identifying any shared vertices of the respective polygon that are shared by another polygon of the polygon mesh; and applying the polyline simplification technique in such a manner that the shared vertices are not candidates for removal from the polygon mesh.

11. The method according to claim 1, the determining the polygon mesh further comprising:

aligning at least one edge of the polygon mesh with a horizontal axis or a vertical axis.

12. The method according to claim 11, the aligning the at least one edge of the polygon mesh further comprising:

determining that the at least one edge of the polygon mesh has an angle with respect to the horizontal or the vertical axis that is less than a threshold angle; and repositioning at least one vertex of the at least one edge so as to align the at least one edge with the horizontal axis or the vertical axis.

13. The method according to claim 1, the generating the plurality of refined room segments further comprising:

determining, for each respective polygon in the polygon mesh, an input room segment from the plurality of input room segments to which the respective polygon corresponds;

determining which edges of the polygon mesh correspond to room boundaries based on the determined input room segments to which each polygon in the polygon mesh corresponds; and generating the plurality of refined room segments using the edges of each polygon in the polygon mesh that correspond to room boundaries and segmented according to the determined input room segment to which each respective polygon corresponds.

14. The method according to claim 13, the determining the input room segment to which each respective polygon corresponds further comprising:

determining, for each sample position of a plurality of sample positions within the respective polygon, a corresponding room segment identifier at the sample position within the plurality of input room segments; and determining a room segment identifier for the respective polygon as a most common corresponding room segment identifier among the plurality of sample positions within the plurality of input room segments.

15. The method according to claim 13, the determining which edges of the polygon mesh correspond to room boundaries further comprising:

dividing each edge of the polygon mesh into fixed length edge segments;

determining, for each respective fixed length edge segment of each edge of the polygon mesh, whether rooms are on both sides of the respective fixed length edge segment; and determining, for each respective fixed length edge segment of each edge of the polygon mesh, that the respective fixed length edge segment corresponds to a room boundary in response to determining that rooms are not on both sides of the respective fixed length edge segment.

16. The method according to claim 1 further comprising:

displaying, on a display, the plurality of refined room segments to a user;

receiving from the user, via a user interface, a selection of at least one room segment of the plurality of refined room segments; and operating a mobile robot to perform a task in the scanned environment depending on the selection.

17. A method for refining room segmentation of a scanned environment, the method comprising:

receiving, with a processor, a plurality of input room segments corresponding to the scanned environment;

extracting, with the processor, a plurality of extracted room polygons from the plurality of input room segments;

determining, with the processor, a respective score for each respective extracted room polygon in the plurality of extracted room polygons;

generating, with the processor, a plurality of refined room polygons by, for each respective extracted room polygon in the plurality of extracted room polygons, (i) including the respective extracted room polygon in the plurality of refined room polygons in response to the respective score being greater than a threshold score, (ii) determining a merged room polygon by merging the respective extracted room polygon with an adjacent extracted room polygon of the plurality of extracted room polygons in response to the respective score being less than the threshold score and the respective extracted room polygon intersecting with at least one other extracted room polygon in the plurality of extracted room polygons, the merged room polygon being included in the plurality of refined room polygons;

determining, with the processor, a polygon mesh based on the plurality of refined room polygons; and generating, with the processor, a plurality of refined room segments based on the polygon mesh.

* * * * *